(12) United States Patent
Xu et al.

(10) Patent No.: US 10,942,081 B2
(45) Date of Patent: Mar. 9, 2021

(54) ON-LINE WHEEL AIRTIGHTNESS DETECTING DEVICE

(71) Applicant: CITIC DICASTAL CO., LTD, Hebei (CN)

(72) Inventors: Zuo Xu, Hebi (CN); Bowen Xue, Hebei (CN); Jiandong Guo, Hebei (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 0 days.

(21) Appl. No.: 16/574,929

(22) Filed: Sep. 18, 2019

(65) Prior Publication Data

US 2020/0171890 A1 Jun. 4, 2020

(30) Foreign Application Priority Data

Nov. 8, 2018 (CN) .......................... 201811321733.X

(51) Int. Cl.
*G01M 3/06* (2006.01)
*G01M 3/04* (2006.01)
*G01M 3/02* (2006.01)

(52) U.S. Cl.
CPC ................ *G01M 3/06* (2013.01); *G01M 3/02* (2013.01); *G01M 3/04* (2013.01)

(58) Field of Classification Search
CPC .................................. G01M 3/06; G01M 3/106
See application file for complete search history.

(56) References Cited

U.S. PATENT DOCUMENTS

| 2,203,688 | A | * | 6/1940 | Little | G01M 3/3218 73/45.6 |
| 2,522,927 | A | * | 9/1950 | Camerota | G01M 3/2846 73/49.6 |
| 2,902,856 | A | * | 9/1959 | Taich | G01M 3/04 73/45.6 |
| 3,894,420 | A | * | 7/1975 | Fuchslin | G01M 3/103 73/45.6 |
| 4,041,772 | A | * | 8/1977 | Taich | G01M 3/103 73/45.6 |
| 4,584,872 | A | * | 4/1986 | Stephens | G01M 3/06 73/45.6 |
| 4,799,384 | A | * | 1/1989 | Casali | G01M 3/06 73/45.5 |
| 5,010,761 | A | * | 4/1991 | Cohen | G01M 3/229 73/40.7 |
| 5,018,381 | A | * | 5/1991 | Campos | G01M 3/06 73/45.5 |

(Continued)

*Primary Examiner* — Alexander A Mercado
(74) *Attorney, Agent, or Firm* — Cooper Legal Group, LLC

(57) ABSTRACT

An on-line wheel airtightness detecting device where a centering device centers a wheel above a roller bed, and a sixth cylinder causes arms to drive clamping jaws through a second gear, second racks, and fifth guide rails to clamp the wheel; a servo motor turns the wheel 90°; a fifth cylinder drives the wheel to a support roller through a fourth guide rail; a second cylinder drives the wheel through first guide pillars; a first cylinder drives the wheel through a first guide rail and flush with a right rubber disc; the hydraulic cylinder drives a left rubber disc through second guide pillars; a motor drives a hollow shaft and the wheel to rotate through a small pulley, a large pulley and a synchronous belt; and compressed air is charged into the hollow shaft, to detect air tightness.

3 Claims, 3 Drawing Sheets

(56) References Cited

U.S. PATENT DOCUMENTS

2015/0276542 A1* 10/2015 Bowen ................. G01M 3/103
                                                    73/45.6
2016/0223425 A1*  8/2016 Liu ..................... G01M 3/329

* cited by examiner

ON-LINE WHEEL AIRTIGHTNESS DETECTING DEVICE

CROSS REFERENCE TO RELATED APPLICATION

This application claims priority to Chinese Patent Application No. 201811311733.X, entitled ON-LINE WHEEL AIRTIGHTNESS DETECTING DEVICE and filed on Nov. 8, 2018, which is incorporated herein by reference for all purposes.

FIELD OF THE INVENTION

The present invention relates to a wheel airtightness detecting device, and specifically relates to an on-line wheel airtightness detecting device.

BACKGROUND OF THE INVENTION

In production of aluminum alloy wheels, airtightness detection is a very important process, and is directly related to the safety of vehicles during driving, so various manufacturers pay great attention. The conventional method for detecting airtightness is to manually carry the machined wheels to a rubber disc of an airtight machine one by one, then raise a water tank of the airtight machine, immerse and inflate the wheels, hold the pressure, and observe whether bubbles are generated. This method has two problems. First, the labor intensity of workers who carry the wheels for a long time is particularly large, and misjudgment is easily caused at fatigue. Second, the frequent rise of the water tank is particularly prone to water leakage.

SUMMARY OF THE INVENTION

The present invention is directed to provide an on-line wheel airtightness detecting device, which can realize automatic and on-line detection of wheel airtightness, effectively reduce the labor intensity of workers, and avoid the problem of water leakage caused by frequent rise and fall of the water tank.

In order to achieve the above objective, the technical solution of the present invention includes an on-line wheel airtightness detecting device that comprises a frame, first guide pillars, first guide sleeves, a first cylinder, a second cylinder, a first lifting plate, a first guide rail, a translating plate, a second guide rail, a third cylinder, a support roller, a water tank, a left rubber disc, a left pressure plate, a left moving plate, second guide pillars, a second guide sleeves, a swivel, a hydraulic cylinder, a roller bed, a centering device, a fifth cylinder, a vertical plate, a fourth guide rail, a second lifting plate, fifth guide rails, a second left sliding plate, second racks, a second gear, a second right sliding plate, a left bearing block, a left shaft, clamping jaws, a pawl, a ratchet, a spring, a right bearing block, a right shaft, a servo motor, a right arm, a large pulley, a hollow shaft, a right fixed plate, a right rubber disc, a large bearing block, a synchronous belt, a small pulley, a motor, a sixth cylinder and a left arm, wherein the water tank is fixed to an upper side of the frame; two second guide sleeves are fixed to a left side of the water tank, and two second guide pillars fitted with the second guide sleeves are mounted on the left of the left moving plate; the hydraulic cylinder is also fixed to the left side of the water tank, and an output end of the hydraulic cylinder is articulated to a left side of the left moving plate; the left pressure plate is mounted on a right side of the left moving plate through the swivel, and the left rubber disc is fixed to a right side of the left pressure plate; the roller bed is mounted above the water tank.

A lifting system comprises: two first guide sleeves which are mounted at a bottom of the water tank, wherein two first guide pillars fitted with the two first guide sleeves are fixed to a bottom of the first lifting plate; the second cylinder which is fixed to the bottom of the water tank, with an output end of the second cylinder being articulated with the bottom of the first lifting plate; the translating plate which is mounted above the first lifting plate through the first guide rail; the first cylinder which is also fixed above the first lifting plate, with an output end of the first cylinder being connected with a right side of the translating plate; the support roller which is mounted above the translating plate through the second guide rail; the third cylinder which is fixed to an upper end of the translating plate, with an output end of the third cylinder being connected to the support roller.

The centering device comprises a fourth cylinder, centering rollers, a first gear, first racks, a first left sliding plate, third guide rails, a fixed plate and a first right sliding plate, wherein the fixed plate is fixed to a top end of the frame; two first racks are respectively fixed to the first left sliding plate and the first right sliding plate, and the two first racks mesh with the first gear fixed below the fixed plate; the first left sliding plate and the first right sliding plate are mounted below the fixed plate through the third guide rails; two centering rollers are respectively fixed below the first left sliding plate and the first right sliding plate; the fourth cylinder is fixed below the fixed plate, and an output end of the fourth cylinder is connected to the first right sliding plate.

A clamping and turning device comprises: the vertical plate which is fixed on the frame on the right of the frame; the second lifting plate which is mounted on a left side of the vertical plate through the fourth guide rail; the fifth cylinder which is fixed to a top end of the vertical plate, with an output end of the fifth cylinder being connected to the second lifting plate; the second left sliding plate and the second right sliding plate are respectively fixed with two second racks, wherein the two second racks mesh with the second gear fixed to the left side of the second lifting plate; the second left sliding plate and the second right sliding plate which are mounted on a left side of the second lifting plate through the fifth guide rails, the left arm and the right arm which are respectively fixed to a left side of the second left sliding plate and the second right sliding plate; the sixth cylinder which is fixed to the left side of the second lifting plate, with an output end of the sixth cylinder being connected to the second right sliding plate; the left bearing block which is fixed to a left side of the left arm, with the left shaft being mounted inside the left bearing block through a bearing; the ratchet and the clamping jaws which are mounted at an end of the left shaft; the pawl which is mounted on a right side of the left arm and cooperates with the ratchet, with the spring being mounted below the pawl; the right bearing block which is fixed to a right side of the right arm, with the right shaft being mounted inside the right bearing block through a bearing and the clamping jaws being fixed on the left of the right shaft; the servo motor which is fixed to a right side of the right bearing block, with an output end of the servo motor being connected to the right shaft.

The middle of the roller bed is discontinuous, with a gap greater than the width of a wheel. A left side of the support roller is movable and a right side of the support roller is fixed, with the left side and the right side of the support roller being connected by the third cylinder therebetween.

During operation, the centering device centers the wheel above the roller bed, the sixth cylinder causes the left arm and the right arm to drive the clamping jaws through the second gear, the second racks, the fifth guide rails and the like to clamp the wheel; the servo motor drives the wheel to turn a required angle, the fifth cylinder drives the wheel to be placed on the support roller through the fourth guide rail, the second cylinder drives the wheel to descend through the first guide pillars, the first cylinder drives the wheel through the first guide rail to move to the right to flush with the right rubber disc, the hydraulic cylinder drives the left rubber disc through the second guide pillars to move to the right to seal the wheel, the motor drives the hollow shaft and the wheel to rotate through the small pulley, the large pulley and the synchronous belt, compressed air is charged into the hollow shaft, and the air tightness can be detected by observing whether bubbles are generated.

The on-line wheel airtightness detecting device in use can realize automatic and on-line detection of wheel airtightness, effectively reduce the labor intensity of workers, and avoid the problem of water leakage caused by frequent rise and fall of the water tank.

These and other features, advantages, and objects of the present invention will be further understood and appreciated by those skilled in the art by reference to the following specification, claims, and appended drawings.

BRIEF DESCRIPTION OF THE DRAWINGS

The embodiments of the present invention will be described in detail below in combination with the accompanying drawings, in which.

Figure 1:
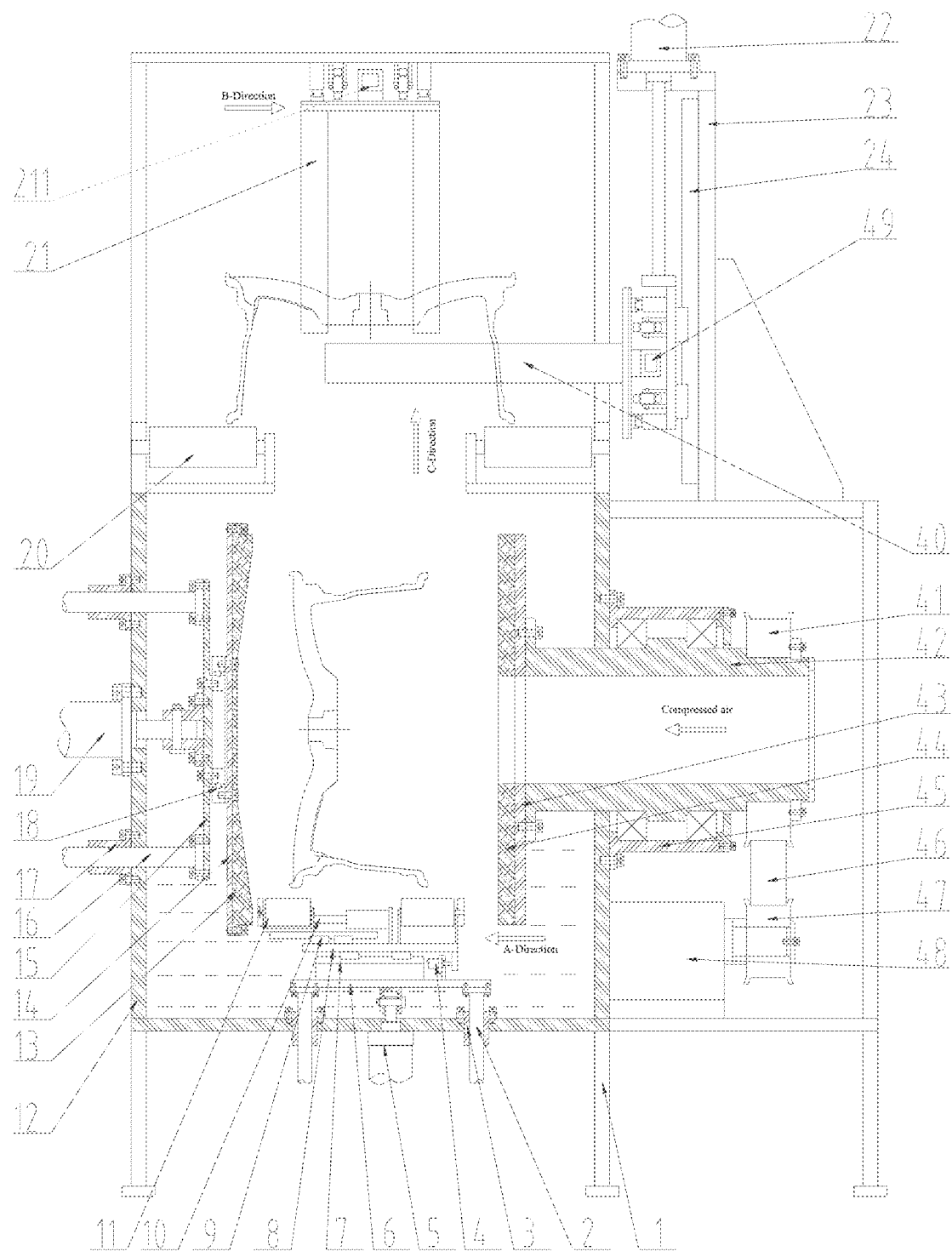
FIG. 1 is a front view of an on-line wheel airtightness detecting device according to the present invention.
Figure 2:
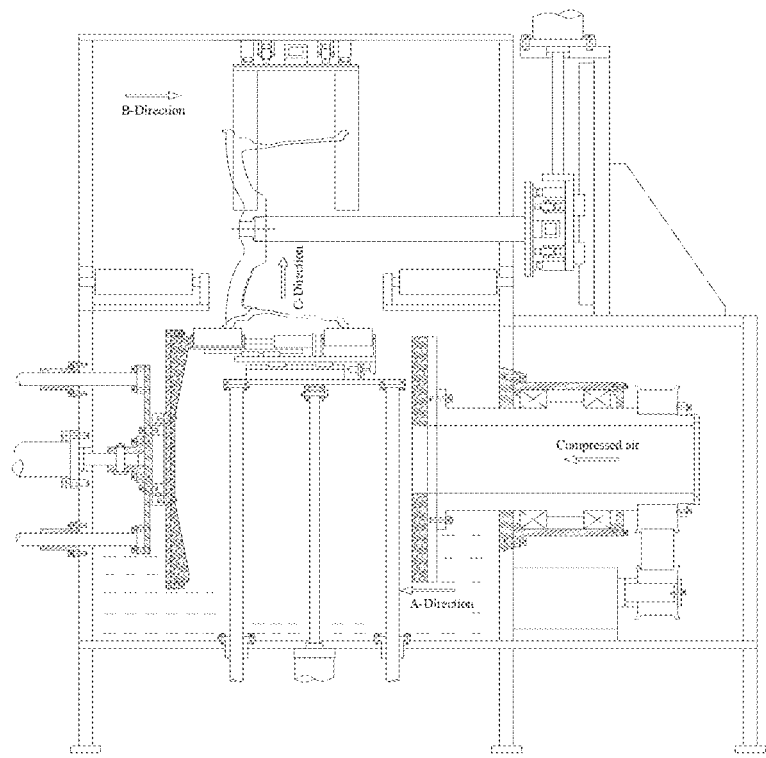
FIG. 2 is a front view when the on-line wheel airtightness detecting device works.
Figure 3:
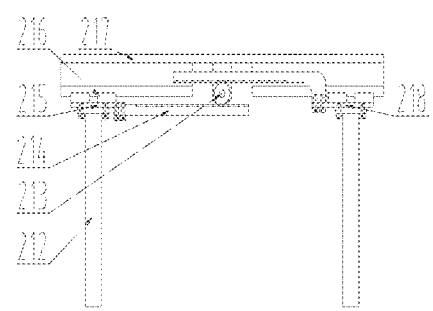
FIG. 3 is a B-direction view of the on-line wheel airtightness detecting device.
Figure 4:
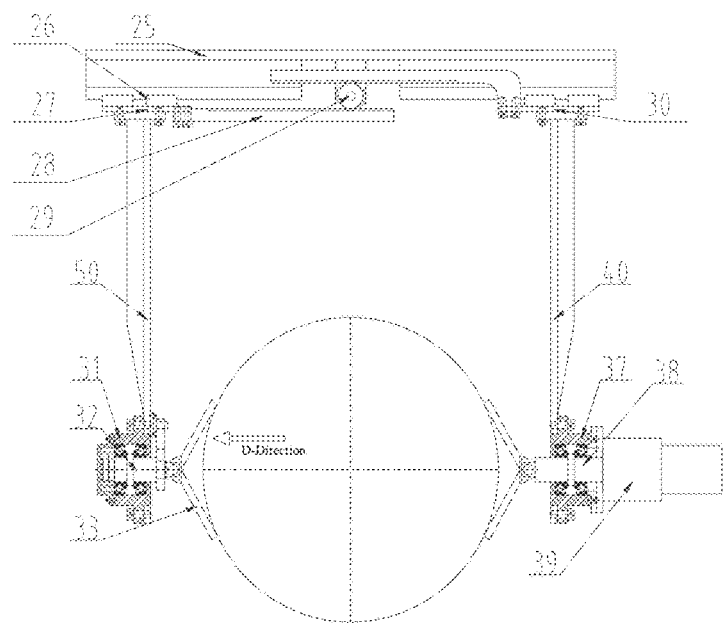
FIG. 4 is a C-direction view of the on-line wheel airtightness detecting device.
Figure 5:
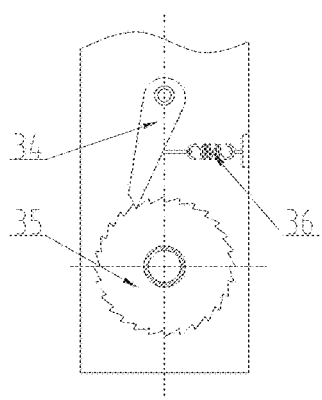
FIG. 5 is a D-direction view of the on-line wheel airtightness detecting device.
Figure 6:
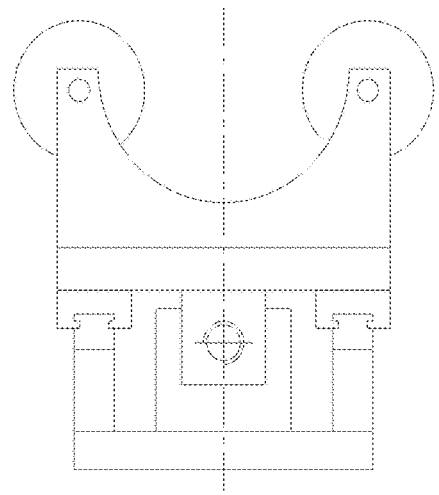
FIG. 6 is an A-direction view of the on-line wheel airtightness detecting device.

In which 1—frame, 2—first guide pillar, 3—first guide sleeve, 4—first cylinder, 5—second cylinder, 6—first lifting plate, 7—first guide rail, 8—translating plate, 9—guide second rail, 10—third cylinder, 11—support roller, 12—water tank, 13—left rubber disc, 14—left pressure plate, 15—left moving plate, 16—second guide pillars, 17—second guide sleeves, 18—swivel, 19—hydraulic cylinder, 20—roller bed, 21—centering device, 22—fifth cylinder, 23—vertical plate, 24—fourth guide rail, 25—second lifting plate, 26—fifth guide rails, 27—second left sliding plate, 28—second racks, 29—second gear, 30—second right sliding plate, 31—left bearing block, 32—left shaft, 33—clamping jaws, 34—pawl, 35—ratchet, 36—spring, 37—right bearing block, 38—right shaft, 39—servo motor, 40—right arm, 41—large pulley, 42—hollow shaft, 43—right fixed plate, 44—right rubber disc, 45—large bearing block, 46—synchronous belt, 47—small pulley, 48—motor, 49—sixth cylinder, 50—left arm, 211—fourth cylinder, 212—centering roller, 213—first gear, 214—first rack, 215—first left sliding plate, 216—third guide rail, 217—fixed plate, 218—first right sliding plate.

DETAILED DESCRIPTION

The details and working conditions of the specific device according to the present invention will be described below in combination with the drawings.

The device comprises a frame 1, first guide pillars 2, first guide sleeves 3, a first cylinder 4, a second cylinder 5, a first lifting plate 6, a first guide rail 7, a translating plate 8, a second guide rail 9, a third cylinder 10, a support roller 11, a water tank 12, a left rubber disc 13, a left pressure plate 14, a left moving plate 15, second guide pillars 16, second guide sleeves 17, a swivel 18, a hydraulic cylinder 19, a roller bed 20, a centering device 21, a fifth cylinder 22, a vertical plate 23, a fourth guide rail 24, a second lifting plate 25, fifth guide rails 26, a second left sliding plate 27, second racks 28, a second gear 29, a second right sliding plate 30, a left bearing block 31, a left shaft 32, clamping jaws 33, a pawl 34, a ratchet 35, a spring 36, a right bearing block 37, a right shaft 38, a servo motor 39, a right arm 40, a large pulley 41, a hollow shaft 42, a right fixed plate 43, a right rubber disc 44, a large bearing block 45, a synchronous belt 46, a small pulley 47, a motor 48, a sixth cylinder 49 and a left arm 50, wherein the water tank 12 is fixed to an upper side of the frame 1; two second guide sleeves 17 are fixed to a left side of the water tank 12, and two second guide pillars 16 fitted with the second guide sleeves 17 are mounted on a left side of the left moving plate 15; the hydraulic cylinder 19 is also fixed to the left side of the water tank 12, and an output end of the hydraulic cylinder is articulated to a left side of the left moving plate 15; the left pressure plate 14 is mounted on a right side of the left moving plate 15 through the swivel 18, and the left rubber disc 13 is fixed to a right side of the left pressure plate 14; the roller bed 20 is mounted above the water tank 12.

A lifting system comprises: two first guide sleeves 3 which are mounted at a bottom of the water tank 12, wherein two first guide pillars 2 fitted with the two first guide sleeves 3 are fixed to a bottom of the first lifting plate 6; the second cylinder 5 which is fixed to the bottom of the water tank 12, with an output end of the second cylinder 5 being articulated with the bottom of the first lifting plate 6; the translating plate 8 which is mounted above the first lifting plate 6 through the first guide rail 7; the first cylinder 4 which is also fixed above the first lifting plate 6, with an output end of the first cylinder 4 being connected with a right side of the translating plate 8; the support roller 11 which is mounted above the translating plate 8 through the second guide rail 9; the third cylinder 10 which is fixed to an upper end of the translating plate 8, with an output end of the third cylinder 10 being connected to the support roller 11.

The centering device 21 comprises a fourth cylinder 211, centering rollers 212, a first gear 213, first racks 214, a first left sliding plate 215, third guide rails 216, a fixed plate 217 and a first right sliding plate 218, wherein the fixed plate 217 is fixed to a top end of the frame 1; two first racks 214 are respectively fixed to the first left sliding plate 215 and the first right sliding plate 218, and the two first racks 214 mesh with the first gear 213 fixed below the fixed plate 217; the first left sliding plate 215 and the first right sliding plate 218 are mounted below the fixed plate 217 through the third guide rails 216; two centering rollers 212 are respectively fixed below the first left sliding plate 215 and the first right sliding plate 218; the fourth cylinder 211 is fixed below the fixed plate 217, and an output end of the fourth cylinder 211 is connected to the first right sliding plate 218.

A clamping and turning device comprises: the vertical plate 23 which is fixed on the frame on the right of the frame 1; the second lifting plate 25 which is mounted on a left side of the vertical plate 23 through the fourth guide rail 24; the fifth cylinder 22 which is fixed to a top end of the vertical plate 23, with an output end of the fifth cylinder 22 being connected to the second lifting plate 25; the second left sliding plate 27 and the second right sliding plate 30 which are respectively fixed with the second left sliding plate 27 and the second right sliding plate 30 two second racks 28, wherein the two second racks 28 mesh with the second gear 29 fixed to a left side of the second lifting plate 25, and the second left sliding plate 27 and the second right sliding plate 30 are mounted on a left side of the second lifting plate 25 through the fifth guide rails 26; the left arm 50 and the right arm 40 which are respectively fixed to a left sides of the second left sliding plate 27 and the second right sliding plate 30; the sixth cylinder 49 which is fixed to the left side of the second lifting plate 25, with an output end of the sixth cylinder 49 being connected to the second right sliding plate 30; the left bearing block 31 which is fixed to a left side of the left arm 50, with the left shaft 32 being mounted inside the left bearing block 31 through a bearing; the ratchet 35 and the clamping jaws 33 which are mounted at an end of the left shaft 32; the pawl 34 which is mounted on a right side of the left arm 50 and cooperates with the ratchet 35, with the spring 36 being mounted below the pawl 34; the right bearing block 37 which is fixed to a right side of the right arm 40, with the right shaft 38 being mounted inside the right bearing block 37 through a bearing; and the clamping jaws 33 being fixed on the left of the right shaft 38; the servo motor 39 which is fixed to a right side of the right bearing block 37, with an output end of the servo motor 39 being connected to the right shaft 38.

The middle of the roller bed 20 is discontinuous, with a gap greater than the width of a wheel. A left side of the support roller 11 is movable and a right side of the support roller 11 is fixed, with the left side and the right side of the support roller 11 being connected by the third cylinder 10 therebetween.

During operation, the centering device 21 centers the wheel above the roller bed 20, the sixth cylinder 49 causes the left arm 50 and the right arm 40 to drive the clamping jaws 33 through the second gear 29, the second racks 28, the fifth guide rails 26 and the like to clamp the wheel; the servo motor 39 drives the wheel to turn a required angle of 90 degrees, the fifth cylinder 22 drives the wheel to be placed on the support roller 11 through the fourth guide rail 24, the second cylinder 5 drives the wheel to descend through the first guide pillars 2, the first cylinder 4 drives the wheel through the first guide rail 7 to move to the right to flush with the right rubber disc 44, the hydraulic cylinder 19 drives the left rubber disc 13 through the second guide pillars 16 to move to the right to seal the wheel, the motor 48 drives the hollow shaft 42 and the wheel to rotate through the small pulley 47, the large pulley 41 and the synchronous belt 46, compressed air is charged into the hollow shaft 42, and the air tightness can be detected by observing whether bubbles are generated.

The invention claimed is:

1. A wheel airtightness detecting device on a production line of a wheel, comprising:
    a frame, two first guide pillars, two first guide sleeves, a first cylinder, a second cylinder, a first lifting plate, a first guide rail, a translating plate, a second guide rail, a third cylinder, a support roller, a water tank, a left rubber disc, a left pressure plate, a left moving plate, two second guide pillars, two second guide sleeves, a swivel, a hydraulic cylinder, a roller bed, a centering device, a fifth cylinder, a vertical plate, a fourth guide rail, a second lifting plate, a fifth guide rail, a second left sliding plate, two second racks, a second gear, a second right sliding plate, a left bearing block, a left shaft, clamping jaws, a pawl, a ratchet, a spring, a right bearing block, a right shaft, a servo motor, a right arm, a first pulley, a hollow shaft, a right fixed plate, a right rubber disc, a first bearing block, a synchronous belt, a second pulley, a motor, a sixth cylinder and a left arm, wherein the water tank is fixed to an upper side of the frame; the two second guide sleeves are fixed to a left side of the water tank, and the two second guide pillars fitted with the two second guide sleeves are mounted on a left of the left moving plate; the hydraulic cylinder is also fixed to the left side of the water tank, and an output end of the hydraulic cylinder is articulated to a left side of the left moving plate; the left pressure plate is mounted on a right side of the left moving plate through the swivel, and the left rubber disc is fixed to a right side of the left pressure plate; the roller bed is mounted above the water tank;

a lifting system that comprises the two first guide sleeves which are mounted at a bottom of the water tank, wherein the two first guide pillars fitted with the two first guide sleeves are fixed to a bottom of the first lifting plate; the second cylinder which is fixed to the bottom of the water tank, with an output end of the second cylinder being articulated with the bottom of the first lifting plate; the translating plate which is mounted above the first lifting plate through the first guide rail; the first cylinder which is also fixed above the first lifting plate, with an output end of the first cylinder being connected with a right side of the translating plate; the support roller which is mounted above the translating plate through the second guide rail; the third cylinder which is fixed to an upper end of the translating plate, with an output end of the third cylinder being connected to the support roller;

the centering device comprises a fourth cylinder, two centering rollers, a first gear, two first racks, a first left sliding plate, a third guide rails, a fixed plate and a first right sliding plate, wherein the fixed plate is fixed to a top end of the frame; the two first racks are respectively fixed to the first left sliding plate and the first right sliding plate, and the two first racks mesh with the first gear fixed below the fixed plate; the first left sliding plate and the first right sliding plate are mounted below the fixed plate through the third guide rail; the two centering rollers are respectively fixed below the first left sliding plate and the first right sliding plate; the fourth cylinder is fixed below the fixed plate, and an output end of the fourth cylinder is connected to the first right sliding plate; and a clamping and turning device that comprises the vertical plate which is fixed on the frame on a right of the frame; the second lifting plate which is mounted on a left side of the vertical plate through the fourth guide rail; the fifth cylinder which is fixed to a top end of the vertical plate, with an output end of the fifth cylinder being connected to the second lifting plate; the second left sliding plate and the second right sliding plate which are respectively fixed with the two second racks, wherein the two second racks mesh with the second gear fixed to a left side of the second lifting plate, and the second left sliding plate and the second right sliding plate are mounted on the left side of the second lifting plate through the fifth guide rail; the left arm and the right arm which are respectively fixed to a left side of the second left sliding plate and the second right sliding plate; the sixth cylinder which is fixed to the left side of the second lifting plate, with an output end of the sixth cylinder being connected to the second right sliding plate; the left bearing block which is fixed to a left side of the left arm, with the left shaft being mounted inside the left bearing block through a first bearing; the ratchet and the clamping jaws which are mounted at an end of the left shaft; the pawl which is mounted on a right side of the left arm and cooperates with the ratchet, with the spring being mounted below the pawl; the right bearing block which is fixed to a right side of the right arm, with the right shaft being mounted inside the right bearing block through a second bearing and the clamping jaws being fixed on a left of the right shaft; the servo motor which is fixed to a right side of the right bearing block, with an output end of the servo motor being connected to the right shaft.

2. The wheel airtightness detecting device on the production line of the wheel according to claim 1, wherein a middle of the roller bed is discontinuous, with a gap greater than a width of the wheel.

3. The wheel airtightness detecting device on the production line of the wheel according to claim 1, wherein a left side of the support roller is movable and a right side of the support roller is fixed, with the left side and the right side of the support roller being connected by the third cylinder therebetween.

\* \* \* \* \*